(12) United States Patent
Ishii

(10) Patent No.: US 11,962,946 B2
(45) Date of Patent: Apr. 16, 2024

(54) IMAGE PROCESSING APPARATUS, DISPLAY SYSTEM, IMAGE PROCESSING METHOD, AND MEDIUM

(71) Applicant: CANON KABUSHIKI KAISHA, Tokyo (JP)

(72) Inventor: Masatoshi Ishii, Koganei (JP)

(73) Assignee: Canon Kabushiki Kaisha, Tokyo (JP)

( * ) Notice: Subject to any disclaimer, the term of this patent is extended or adjusted under 35 U.S.C. 154(b) by 631 days.

(21) Appl. No.: 16/942,803

(22) Filed: Jul. 30, 2020

(65) Prior Publication Data
US 2020/0358992 A1 Nov. 12, 2020

Related U.S. Application Data

(63) Continuation of application No. PCT/JP2019/003183, filed on Jan. 30, 2019.

(30) Foreign Application Priority Data

Feb. 20, 2018 (JP) .................................. 2018-028111
Dec. 17, 2018 (JP) .................................. 2018-235364

(51) Int. Cl.
*H04N 9/31* (2006.01)
*G06T 3/08* (2024.01)

(52) U.S. Cl.
CPC ............. *H04N 9/3185* (2013.01); *G06T 3/08* (2024.01); *H04N 9/3188* (2013.01)

(58) Field of Classification Search
CPC ........ G03B 21/14; H04N 9/31; H04N 9/3185; H04N 9/3188; H04N 9/3147; H04N 9/3194; G06F 3/147; G06F 3/1446; G06T 3/005
See application file for complete search history.

(56) References Cited

U.S. PATENT DOCUMENTS

| | | | | |
|---|---|---|---|---|
| 6,456,339 B1* | 9/2002 | Surati | ................. | H04N 9/3194 348/746 |
| 6,793,350 B1* | 9/2004 | Raskar | ................. | G06V 10/145 353/121 |
| 7,740,361 B2* | 6/2010 | Jaynes | ................. | H04N 9/3194 345/1.3 |
| 7,893,393 B2* | 2/2011 | Webb | ................. | H04N 9/3147 353/121 |

(Continued)

FOREIGN PATENT DOCUMENTS

| JP | H04-063092 A | 2/1992 |
|---|---|---|
| JP | 2002-350999 A | 12/2002 |

(Continued)

OTHER PUBLICATIONS

Apr. 9, 2019 International Search Report in International Patent Appln. No. PCT/JP2019/003183.

*Primary Examiner* — Bao-Luan Q Le
(74) *Attorney, Agent, or Firm* — Venable LLP

(57) ABSTRACT

There is provided with an image processing apparatus that generates a display image to be displayed in a display system including a display area. An obtaining unit obtains one input image acquired through shooting by one image capturing apparatus. A generating unit generates the display image from the input image on the basis of a correspondence between a first projection plane corresponding to the input image and a second projection plane corresponding to the display area.

15 Claims, 11 Drawing Sheets

(56) References Cited

U.S. PATENT DOCUMENTS

| | | | | |
|---|---|---|---|---|
| 8,013,904 B2* | 9/2011 | Tan | | H04N 17/002 348/222.1 |
| 8,195,006 B2* | 6/2012 | Klemmer | | H04N 9/3194 382/206 |
| 8,212,841 B2* | 7/2012 | Clodfelter | | H04N 9/12 345/623 |
| 8,262,229 B2* | 9/2012 | Nelson | | H04N 9/3182 353/121 |
| 8,274,613 B2* | 9/2012 | Nelson | | H04N 9/3194 348/333.03 |
| 8,311,366 B2* | 11/2012 | Schiewe | | H04N 9/3185 348/383 |
| 8,355,601 B2* | 1/2013 | Ding | | H04N 9/3182 382/199 |
| 9,195,121 B2* | 11/2015 | Sajadi | | H04N 9/3147 |
| 9,412,151 B2 | 8/2016 | Ishii | | |
| 9,641,817 B2* | 5/2017 | Kim | | H04N 9/3185 |
| 10,096,085 B2* | 10/2018 | Kim | | H04N 9/3185 |
| 10,863,154 B2* | 12/2020 | Ishii | | H04N 9/3194 |
| 2004/0184013 A1* | 9/2004 | Raskar | | G06T 3/0081 353/121 |
| 2005/0271299 A1* | 12/2005 | Ajito | | G06T 3/005 353/30 |
| 2007/0273795 A1* | 11/2007 | Jaynes | | H04N 9/3194 348/E9.027 |
| 2008/0012879 A1* | 1/2008 | Clodfelter | | H04N 9/3147 345/619 |
| 2008/0095468 A1* | 4/2008 | Klemmer | | H04N 9/3194 382/285 |
| 2008/0129967 A1* | 6/2008 | Webb | | H04N 9/3147 353/121 |
| 2009/0067749 A1* | 3/2009 | Schiewe | | H04N 9/3194 382/294 |
| 2010/0141780 A1* | 6/2010 | Tan | | H04N 9/3185 348/222.1 |
| 2011/0050873 A1* | 3/2011 | Nelson | | H04N 9/3194 382/203 |
| 2011/0176007 A1* | 7/2011 | Ding | | H04N 9/3194 348/189 |
| 2011/0228104 A1* | 9/2011 | Nelson | | H04N 9/3182 348/190 |
| 2012/0098937 A1* | 4/2012 | Sajadi | | H04N 9/3185 348/46 |
| 2013/0070094 A1* | 3/2013 | Majumder | | H04N 9/3147 348/143 |
| 2013/0257857 A1 | 10/2013 | Kakizawa et al. | | |
| 2015/0163447 A1 | 6/2015 | Kim | | |
| 2016/0142692 A1* | 5/2016 | Kim | | G03B 37/04 348/745 |
| 2017/0142384 A1* | 5/2017 | Yoshimura | | H04N 9/3185 |
| 2019/0260976 A1* | 8/2019 | Ishii | | G06F 3/1446 |
| 2020/0005738 A1* | 1/2020 | Ishii | | G06F 3/012 |
| 2020/0137363 A1* | 4/2020 | Nakada | | G03B 21/14 |

FOREIGN PATENT DOCUMENTS

| | | |
|---|---|---|
| JP | 2005-277825 A | 10/2005 |
| JP | 2005-347813 A | 12/2005 |
| JP | 2007-318754 A | 12/2007 |
| JP | 2013-211672 A | 10/2013 |
| JP | 2017-502583 A | 1/2017 |
| WO | 2015/088187 A1 | 6/2015 |

\* cited by examiner

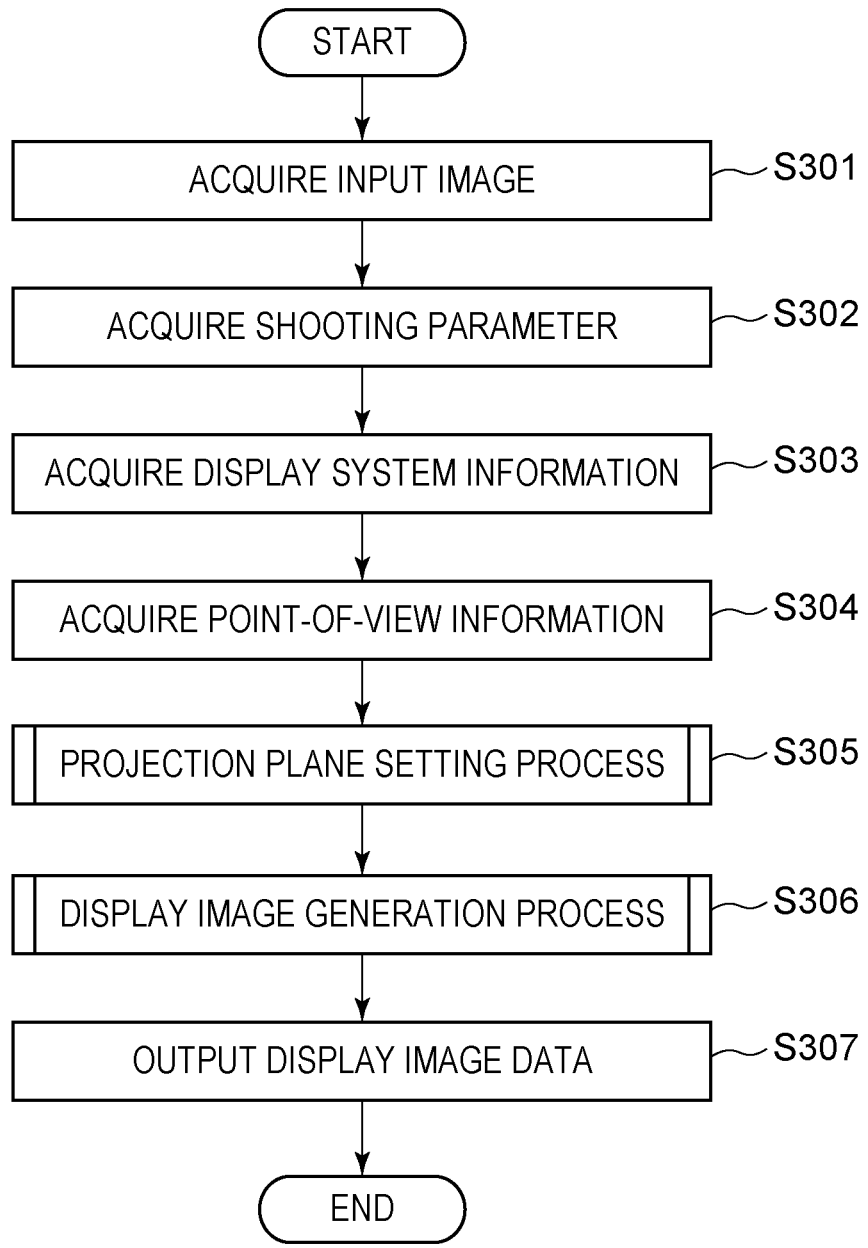

IMAGE PROCESSING APPARATUS, DISPLAY SYSTEM, IMAGE PROCESSING METHOD, AND MEDIUM

CROSS-REFERENCE TO RELATED APPLICATIONS

This application is a Continuation of International Patent Application No. PCT/JP2019/003183, filed Jan. 30, 2019, which claims the benefit of Japanese Patent Application No. 2018-028111, filed Feb. 20, 2018 and Japanese Patent Application No. 2018-235364, filed Dec. 17, 2018, all of which are hereby incorporated by reference herein in their entirety.

BACKGROUND OF THE INVENTION

Field of the Invention

The present invention relates to a technique for generating an image for a display system that displays a wide-field image.

Background Art

Hitherto, there has been known, as one of display systems that display an image, a system that displays an image on a display screen placed so as to cover the field of view of a viewer, thereby giving the viewer a highly realistic sensation.

PTL 1 describes a method for displaying an image on a spherical wide-viewing-angle screen whose concave surface faces a viewer. According to the method described in PTL 1, a mapping process of mapping a flat image onto a spherical shape is performed to generate an image to be displayed on the screen.

A wide-field image can be displayed by placing, instead of a spherical screen, a plurality of flat display screens so as to cover the field of view of a viewer. For example, a plurality of flat display screens are placed such that the normals to the individual display screens have an intersection point. However, if a flat image is mapped onto the individual display screens in such a display system, an unnatural display image is generated.

CITATION LIST

Patent Literature

PTL 1: Japanese Patent Laid-Open No. 2007-318754

SUMMARY OF THE INVENTION

According to an embodiment of the present invention, an image processing apparatus that generates a display image to be displayed in a display system including a display area comprises: an obtaining unit configured to obtain one input image acquired through shooting by one image capturing apparatus; and a generating unit configured to generate the display image from the input image on the basis of a correspondence between a first projection plane corresponding to the input image and a second projection plane corresponding to the display area.

According to an embodiment of the present invention, a display system comprises a display area in which an image is displayed, wherein the display area has a configuration in which a plurality of flat display screens are placed, each display screen being capable of displaying an image, a display image to be displayed on each of the plurality of display screens is generated on the basis of one input image acquired through shooting by one image capturing apparatus, and the display area displays an image resulting from projecting the input image on a projection plane having a shape formed by cutting out a part of a cylindrical surface.

According to an embodiment of the present invention, a non-transitory computer-readable medium stores a program which, when executed by a computer comprising a processor and a memory, causes the computer to perform an image processing method of generating a display image to be displayed in a display system including a display area, the method comprising: obtaining one input image acquired through shooting by one image capturing apparatus; and generating the display image from the input image on the basis of a correspondence between a first projection plane corresponding to the input image and a second projection plane corresponding to the display area.

According to an embodiment of the present invention, an image processing method of generating a display image to be displayed in a display system including a display area comprises: obtaining one input image acquired through shooting by one image capturing apparatus; and generating the display image from the input image on the basis of a correspondence between a first projection plane corresponding to the input image and a second projection plane corresponding to the display area.

Further features of the present invention will become apparent from the following description of exemplary embodiments with reference to the attached drawings.

BRIEF DESCRIPTION OF THE DRAWINGS

FIG. 3 is a flowchart illustrating a flow of processing executed in the image processing apparatus.

DESCRIPTION OF THE EMBODIMENTS

Hereinafter, embodiments of the present invention will be described with reference to the drawings. Note that the following embodiments do not necessarily limit the present invention and that all the combinations of features described in the embodiments are not necessarily essential to solve an issue of the present invention.

Figure 4:
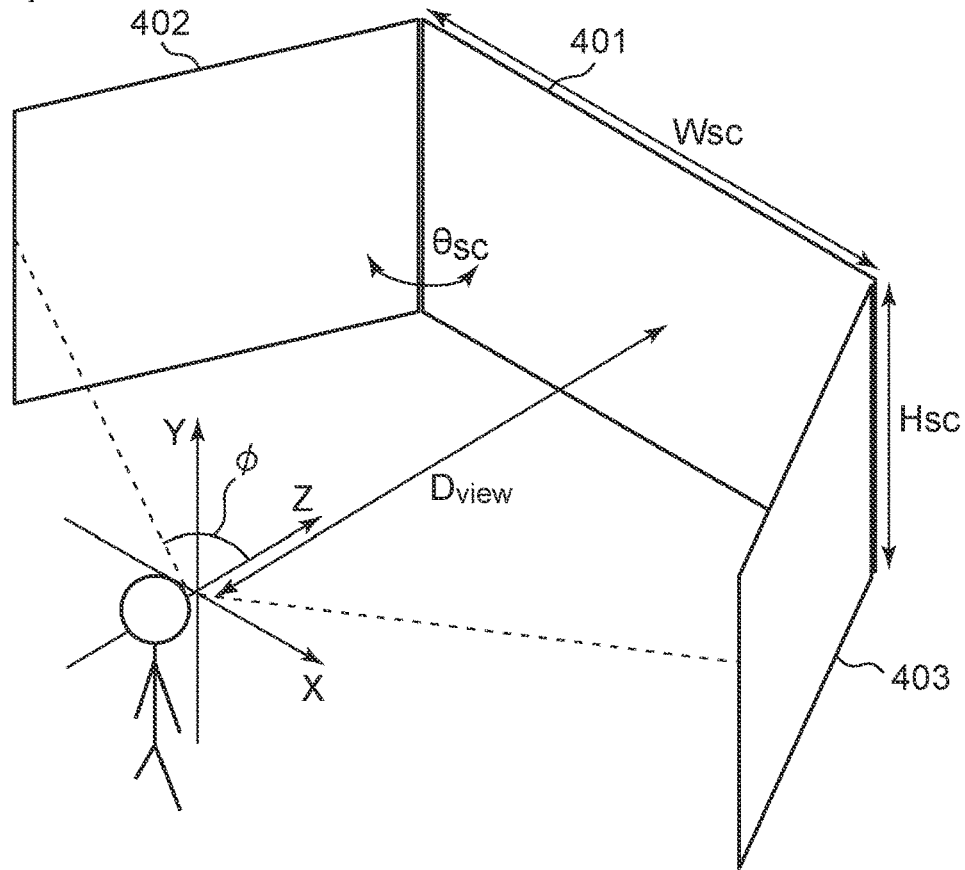
FIG. 4 is a diagram illustrating an example of a display system.

In a first embodiment, a description will be given of, as an example, an image processing apparatus for a display system that displays a wide-field image by placing three flat displays, each being capable of displaying an image, so as to cover the field of view of a viewer. FIG. 4 illustrates an example of a display system assumed in the present embodiment. In the display system according to the present embodiment, three displays including a center display 401, a left display 402, and a right display 403 constitute a display area for displaying an image. The center display 401, the left display 402, and the right display 403 are placed so as to form an isosceles trapezoid when viewed from above. As each display, for example, a light-emitting device such as a liquid crystal display is used. The center display 401 is placed in front of a viewer. The left display 402 is placed so as to be in contact with a left end of the center display 401 viewed from the viewer and to have an angle Else formed with the center display 401. Likewise, the right display 403 is placed so as to be in contact with a right end of the center display 401 viewed from the viewer and to have an angle Else formed with the center display 401. Thus, the three displays are placed such that the normals to the individual display surfaces have an intersection point. Display images are displayed on the respective display surfaces facing the intersection point. As a result of placing the three flat display screens (displays) in this manner, the display area covers the field of view of the viewer. Displaying of an image in this display system gives the viewer a realistic sensation in which the viewer feels like he/she is in a location where the displayed image was captured. In the present embodiment, a description will be given of the image processing apparatus that generates display images to be displayed in the display system illustrated in FIG. 4.

In the present embodiment, an angle at which the viewer views an image displayed in the display area (three displays) in the display system is referred to as a view angle. Display images to be displayed on the respective displays are each generated from a common input image. That is, in the present embodiment, three display images are generated on the basis of an input image captured by using one image capturing apparatus (for example, a digital camera).

Figure 1:
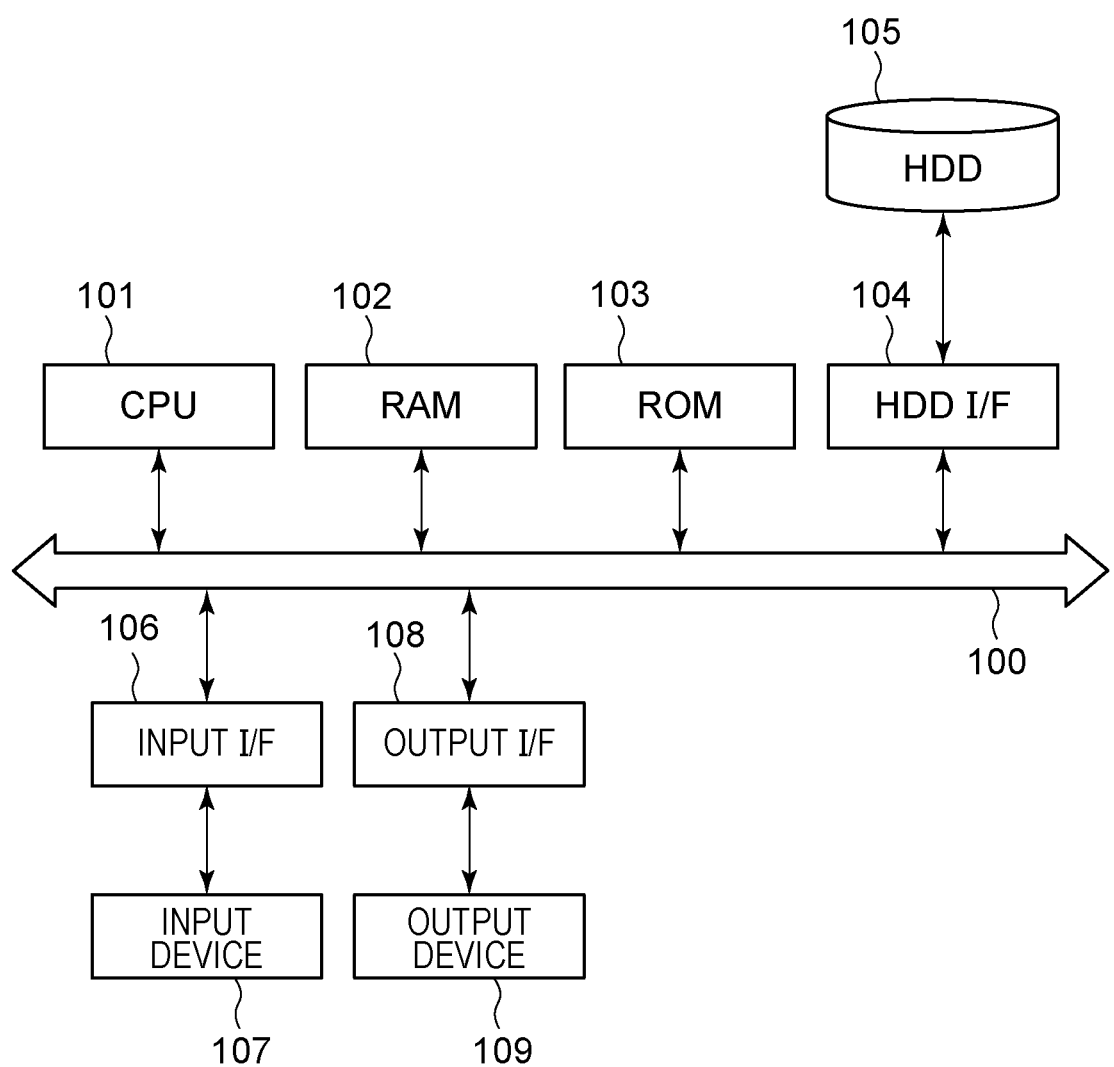
FIG. 1 is a diagram illustrating a hardware configuration of an image processing apparatus.

FIG. 1 illustrates a hardware configuration of the image processing apparatus according to the present embodiment. A CPU 101 executes programs stored in a ROM 103 and a hard disk drive (HDD) 105 by using a RAM 102 as a work memory and controls individual components described below via a system bus 100. Accordingly, various processes described below are executed. An HDD I/F 104 is an interface of, for example, serial ATA (SATA) or the like, and connects a secondary storage device such as the HDD 105 or an optical disc drive. The CPU 101 is capable of reading out data from the HDD 105 and writing data in the HDD 105 via the HDD I/F 104. Furthermore, the CPU 101 is capable of developing data stored in the HDD 105 in the RAM 102 and also storing data developed in the RAM 102 in the HDD 105. The CPU 101 is capable of regarding the data developed in the RAM 102 as a program and executing the program. An input I/F 106 is a serial bus interface of, for example, USB, IEEE 1394, or the like, and connects an input device 107 such as a keyboard or a mouth. The CPU 101 is capable of reading data from the input device 107 via the input I/F 106. An output I/F 108 is a video output interface of, for example, DVI, HDMI (registered trademark), or the like, and connects an output device 109 such as a liquid crystal display or a projector. The CPU 101 is capable of transmitting data to the output device 109 via the output I/F 108 and causing display to be executed. In the present embodiment, the output device 109 is the display system including a display area illustrated in FIG. 4.

Figure 2A:
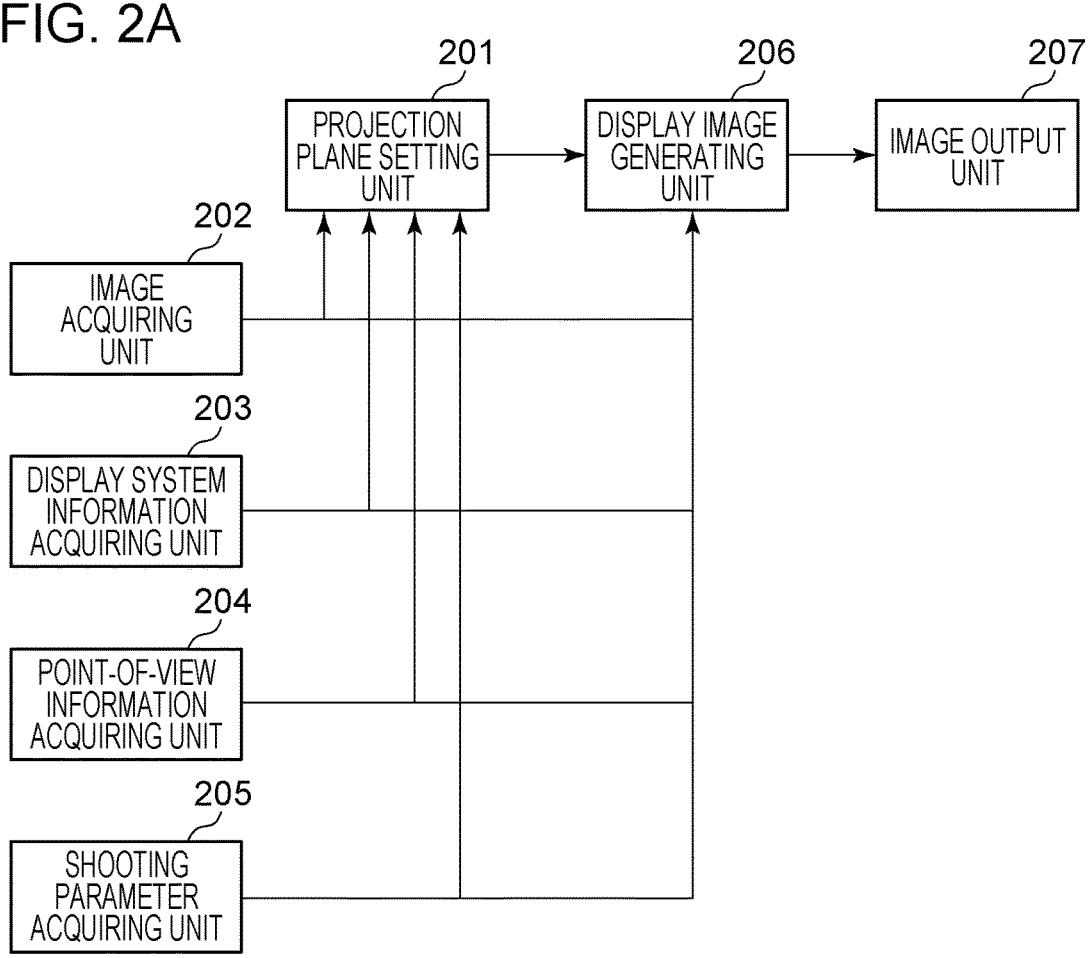
FIG. 2A is a block diagram illustrating a functional configuration of the image processing apparatus.
Figure 2B:
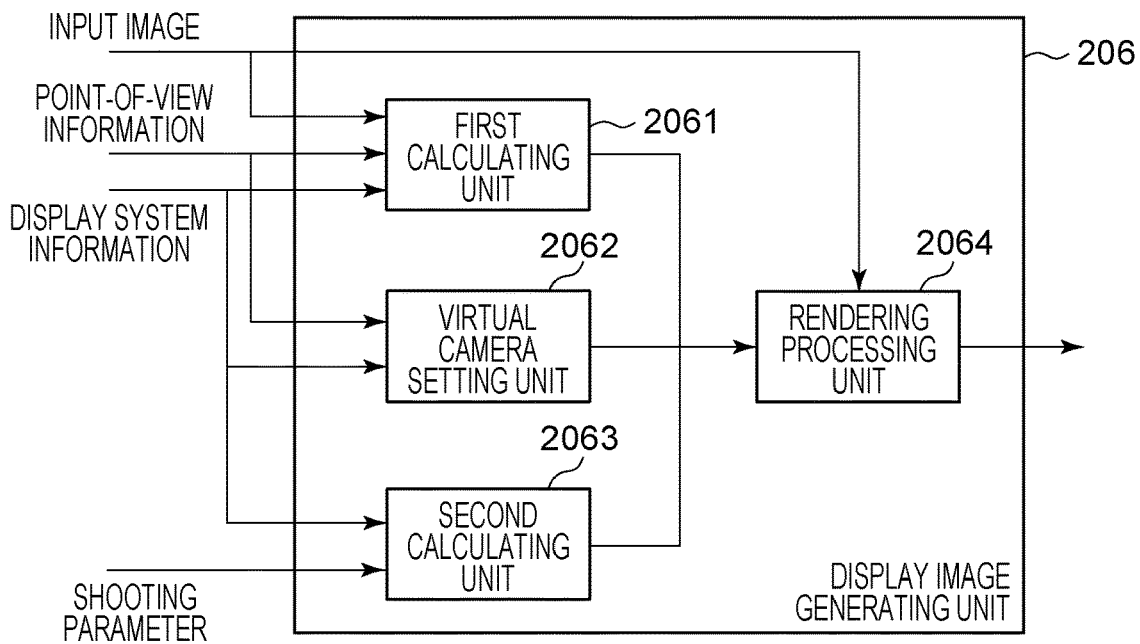
FIG. 2B is a block diagram illustrating a functional configuration of the image processing apparatus.

FIGS. 2A-2B are a block diagram illustrating a functional configuration of the image processing apparatus according to the present embodiment. In FIG. 2A, the image processing apparatus includes a projection plane setting unit 201, an image acquiring unit 202, a display system information acquiring unit 203, a point-of-view information acquiring unit 204, a shooting parameter acquiring unit 205, a display image generating unit 206, and an image output unit 207. The projection plane setting unit 201 sets two projection planes for generating, from an input image, display images to be displayed on the respective displays in the display system. In the present embodiment, three display images are generated from an input image by using a flat virtual projection plane (hereinafter referred to as a flat projection plane) corresponding to the input image and a curved virtual projection plane (hereinafter referred to as a curved projection plane). Accordingly, the projection plane setting unit 201 sets a flat projection plane and a curved projection plane. The flat projection plane is set in accordance with the aspect ratio of the input image and the shooting field angle at which the input image acquired through shooting has been captured. The curved projection plane is a projection plane having a shape formed of a free curved plane and herein has a shape formed by cutting out a part of a side surface of a cylinder. The curved projection plane can also be referred to as a plane formed by curving a flat plane in a horizontal direction. The curved projection plane has, as viewed from above, an arc shape with a smooth line segment, different from a shape with corners formed by the three displays in the display system (a part of an isosceles trapezoid). The projection plane setting unit 201 sets the curved projection plane in accordance with a point-of-view position, and the sizes and positional relationship of the individual displays in the display system.

The image acquiring unit 202 acquires an image obtained through shooting and outputs the image as an input image to the display image generating unit 206.

The display system information acquiring unit 203 acquires information about the display area (here, displays) in the display system. In the present embodiment, it is assumed to acquire information indicating the number of displays, the shapes and sizes of the individual display surfaces, and the positional relationship among a plurality of displays.

The point-of-view information acquiring unit 204 acquires point-of-view information indicating the point-of-view position of a viewer. The point-of-view information is information indicating the three-dimensional position of the point of view of the viewer when the viewer views the image display area in the display system. In the present embodiment, it is assumed that display images to be displayed in the display system are generated in advance before the viewer performs viewing. However, in the display system illustrated in FIG. 4, the display images to be displayed on the respective displays change when the view angle changes. The view angle varies according to the distance from which the viewer views the displays. Thus, in the present embodiment, to generate display images in advance, it is necessary to assume the position at which the viewer will view the images. In the present embodiment, it is assumed that a point-of-view position desired for the viewer to view the displays is acquired as point-of-view information, and thereby the point-of-view position is specified.

The shooting parameter acquiring unit 205 acquires a shooting parameter of the image capturing apparatus set when an input image was acquired through shooting. The shooting parameter acquiring unit 205 is capable of acquiring a shooting parameter on the basis of metadata accompanying the input image. Alternatively, the shooting parameter may be acquired on the basis of information input by a user through the input device 107.

The display image generating unit 206 generates, from one input image, display images to be displayed on the respective displays on the basis of the positional relationship between the point-of-view position and the individual displays. The details of the display image generating unit 206 will be described below. The image output unit 207 outputs the generated three display images to the respective displays.

Hereinafter, a flow of processing executed by the image processing apparatus according to the present embodiment will be described. FIG. 3 is a flowchart illustrating a flow of image processing according to the present embodiment. The CPU 101 reads out a program that is stored in the ROM 103 or the HDD 105 and that implements the flowchart illustrated in FIG. 3, and executes the program by using the RAM 102 as a work area. Accordingly, the CPU 101 plays roles as the individual functional components illustrated in FIGS. 2A-2B. In the following flowchart, each step will be abbreviated as "S".

In S301, the image acquiring unit 202 acquires, as an input image, captured image data stored in the HDD 105 and representing a captured image, and stores the captured image data in the RAM 102.

In S302, the shooting parameter acquiring unit 205 acquires a shooting parameter from metadata accompanying the captured image data. In the present embodiment, the shooting parameter acquiring unit 205 acquires, as a shooting parameter, information specifying a shooting field angle and a lens projection method used in shooting. In the present embodiment, it is assumed that an input image is captured through a lens using a central projection method, which is used in typical lenses.

In S303, the display system information acquiring unit 203 acquires display system information about the image display area in the display system. In the present embodiment, the display system information acquiring unit 203 acquires information indicating the number of displays for displaying images, the shapes and sizes of the individual display surfaces, and the arrangements of the individual displays. In the present embodiment, the number of displays is three as illustrated in FIG. 4. Each display has a flat rectangle shape with a width Wsc and a height Hsc. As for the arrangements of the three displays, each of the open angle between the center display and the right display and the open angle between the center display and the left display is an angle θsc. The view angle (the display angle) at which the display area constituted by the three displays is viewed from the point-of-view position is 2φ. These pieces of display system information are acquired from the input device 107 into the RAM 102 on the basis of a user instruction. Alternatively, these pieces of information may be held in the HDD 105 as a package of display system information in advance and may be selected from the HDD 105 as necessary.

In S304, the point-of-view information acquiring unit 204 acquires point-of-view information from the input device 107 on the basis of a user instruction. In the present embodiment, the point-of-view information acquiring unit 204 acquires a distance Dview from a center position of the screen of the center display 401 as point-of-view information.

In S305, the projection plane setting unit 201 sets a flat projection plane and a curved projection plane to be used to generate display images. The details of a projection plane setting process will be described below.

In S306, the display image generating unit 206 generates display image data representing display images to be displayed on the respective displays. The details of a display image generation process will be described below.

In S307, the image output unit 207 outputs the generated display images corresponding to the respective displays from the RAM 102 to the output device 109 via the output I/F 108. Alternatively, the generated display images may be stored in the HDD 105.

Projection Plane Setting Process

Next, a projection plane setting process will be described in detail. In the projection plane setting process, two projection planes to be used in a display image generation process are set. A first projection plane is a flat projection plane and is a projection plane for placing an input image in a virtual space. A second projection plane is a curved projection plane and is a projection plane for projecting the input image onto the structure of a display area. The second projection plane has a role of approximating the input image to the structure (shape) of the display area. The display area according to the present embodiment is placed such that the three displays form angles when viewed from above. If display images for the respective displays are generated by directly associating the flat projection plane with the individual displays, a subject looks like being bent near a boundary at which two displays are adjacent to each other when the images are viewed from the point-of-view position. This is because the distance from the point of view to the subject is converted to the distance from the point of view to the display area. Accordingly, in the present embodiment, the display images for the respective displays are generated on the basis of an image obtained by projecting the flat projection plane (first projection plane) onto the curved projection plane (second projection plane). That is, it is desired that the second projection plane be a projection plane whose shape is more similar to a shape formed by the three displays than to a flat plane and has no corners when viewed from above. The distance between a point on the curved projection plane and the point-of-view position smoothly changes along with the horizontal direction. When the flat projection plane is associated with the second projection plane, the display image is displayed in the display area such that the viewer feels like he/she is viewing an image projected onto the curved projection plane from the point-of-view position. As a result, a phenomenon can be prevented from occurring where a subject looks like being bent near a boundary at which two displays are adjacent to each other.

Figure 5:
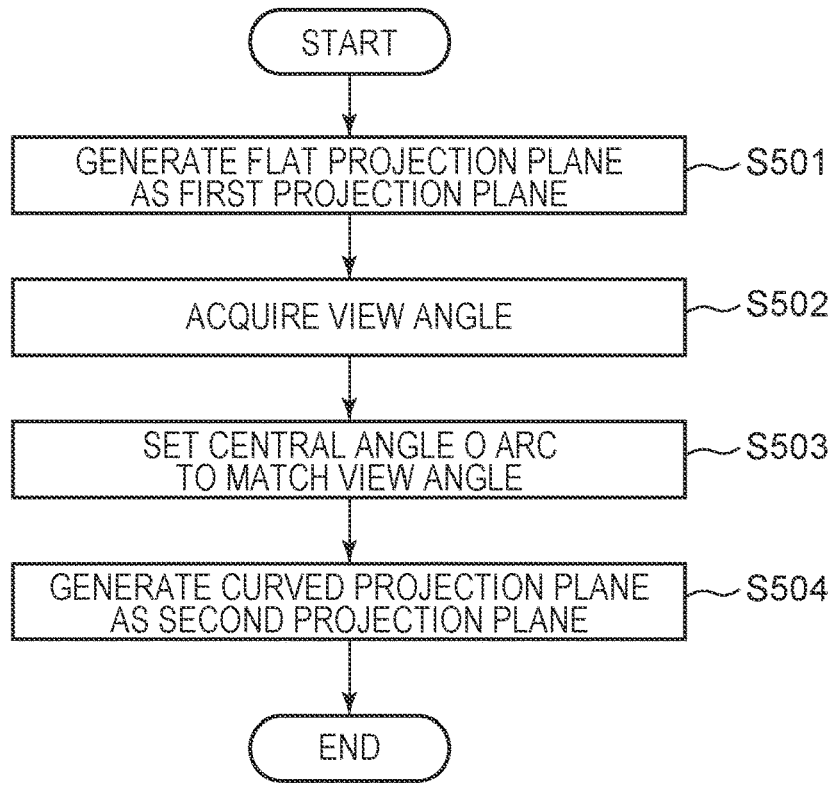
FIG. 5 is a flowchart illustrating a flow of a projection plane setting process.

FIG. 5 is a flowchart illustrating the details of a projection plane setting process executed by the projection plane setting unit 201. Hereinafter, the individual steps of the flowchart will be described.

In S501, the projection plane setting unit 201 generates a flat projection plane as a first projection plane. The flat projection plane is constituted by a rectangular flat plane having the same aspect ratio as the captured image. In addition, the projection plane setting unit 201 calculates the size and position of the flat projection plane and places the flat projection plane in a virtual space such that the view angle at which the flat projection plane is viewed from the point-of-view position matches the shooting field angle. In this way, as a result of causing the point-of-view position to match the position of the image capturing apparatus at the time of shooting in the virtual space, it is possible to generate a display image with a small spatial distortion.

Figure 7:
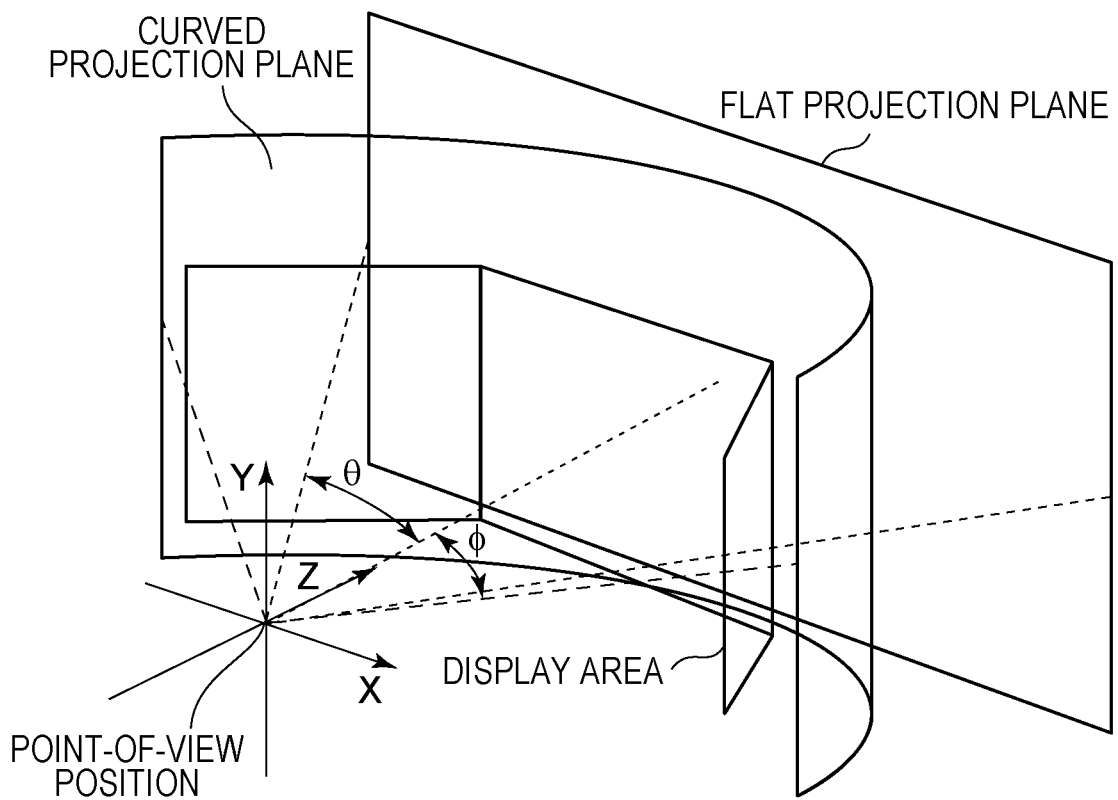
FIG. 7 is a diagram illustrating a positional relationship among a point-of-view position, a display area, a flat projection plane, and a curved projection plane.

FIG. 7 is a diagram illustrating a relationship among the point-of-view position, the display area, and the virtual projection planes. In a virtual space, XYZ three-dimensional coordinates are defined in which the point-of-view position is the origin. In such a virtual space, the flat projection plane is placed at a position that is parallel to an XY flat plane and at which the Z-axis passes through the center of the flat projection plane. The individual displays of the display area are placed such that the distance between the origin (the point-of-view position) and the center position of the center display is Dview when a flat plane representing the display area is placed in the virtual space. That is, the center coordinates of the center display are (0, 0, Dview). The three displays are placed so as to be symmetrical about the Z-axis. Here, when half the shooting field angle in the horizontal direction in the input image is represented by θ, half the view angle of the flat projection plane from the point-of-view position is represented by θ, as illustrated in FIG. 7.

In S502, the projection plane setting unit 201 acquires a view angle, which is a view angle at which the display area is viewed from the point-of-view position. As illustrated in FIG. 4, in the present embodiment, the angle between a straight line connecting the point-of-view position to a center point in an up-down direction of the left end of the left display and a straight line connecting the point-of-view position to a center point in the up-down direction of the right end of the right display is defined as a view angle in the horizontal direction. When the view angle is $2\phi$, an angle $\phi$ is ½ of the view angle.

In S503, the projection plane setting unit 201 sets the central angle of the arc of a curved projection plane in accordance with the view angle $2\phi$ acquired in S502.

In S504, the projection plane setting unit 201 generates a curved projection plane in the virtual space. The curved projection plane has a shape formed by cutting out a side surface of a cylinder by the central angle set in S503. The height of the curved projection plane is set such that the ratio between the length and height of the arc matches the ratio between the width and height of the flat projection plane. The projection plane setting unit 201 places the curved projection plane that has been set in accordance with display system information in the virtual space such that the center of the cylindrical surface matches the point-of-view position. Thus, the curved projection plane is placed at a position at which the Z-axis in the virtual space passes through the center of the curved projection plane. As described above, in the curved projection plane, the cross section of the curved surface is arc-shaped with a central angle identical to the view angle, and the center of the circle matches the point-of-view position.

Display Image Generation Process

Now, a display image generation process will be described in detail. The display image generating unit 206 renders a curved projection plane by using a virtual camera placed at the point-of-view position in a virtual apace, thereby generating display images corresponding to the respective displays.

FIG. 2B is a block diagram illustrating a detailed configuration of the display image generating unit 206. A first calculating unit 2061 calculates a correspondence between an input image and a flat projection plane. A second calculating unit 2063 calculates a correspondence between the flat projection plane and a curved projection plane. A virtual camera setting unit 2062 sets virtual cameras corresponding to the plurality of displays in a virtual space. In the display system assumed in the present embodiment, there are three displays and thus three virtual cameras are set. A rendering processing unit 2064 calculates, for each virtual camera, pixel values of individual pixels of an image formed in the virtual camera by using the correspondence between the input image and the flat projection plane and the correspondence between the flat projection plane and the curved projection plane, thereby generating display images.

Figure 6:
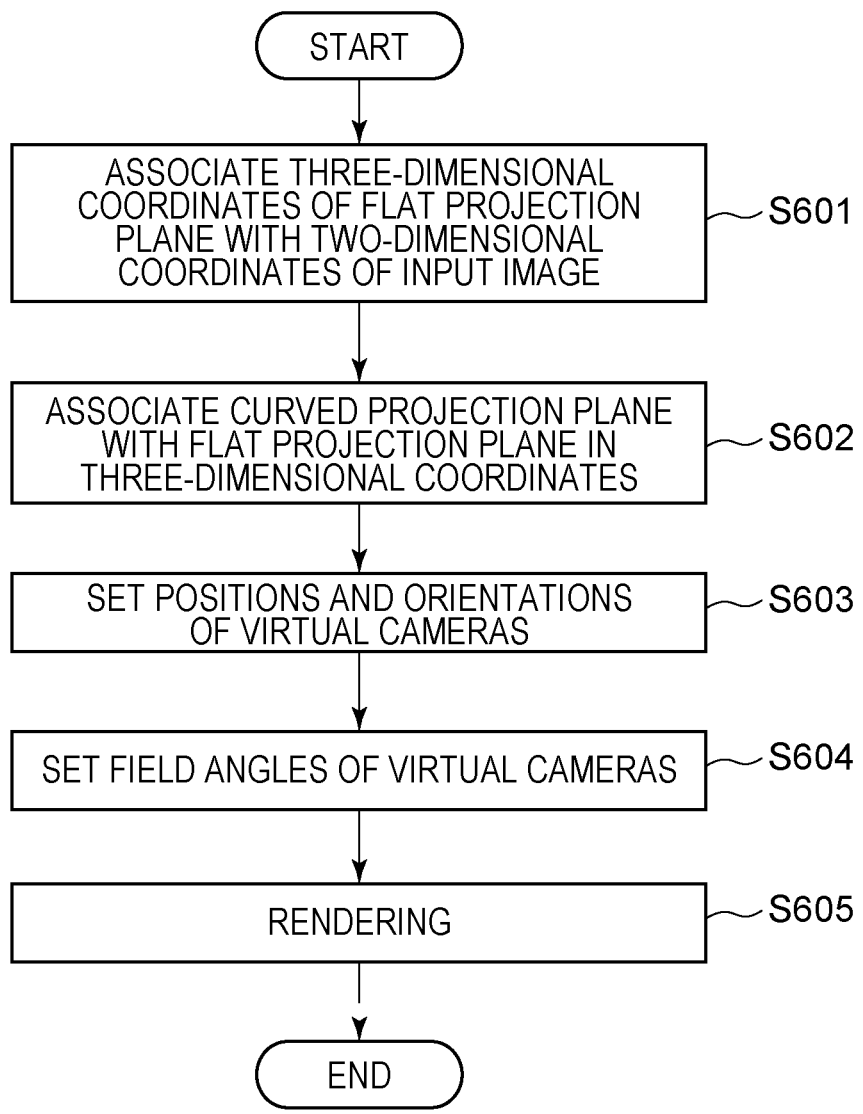
FIG. 6 is a flowchart illustrating a flow of a display image generation process.

FIG. 6 is a flowchart illustrating the details of a display image generation process according to the present embodiment.

Figure 8:
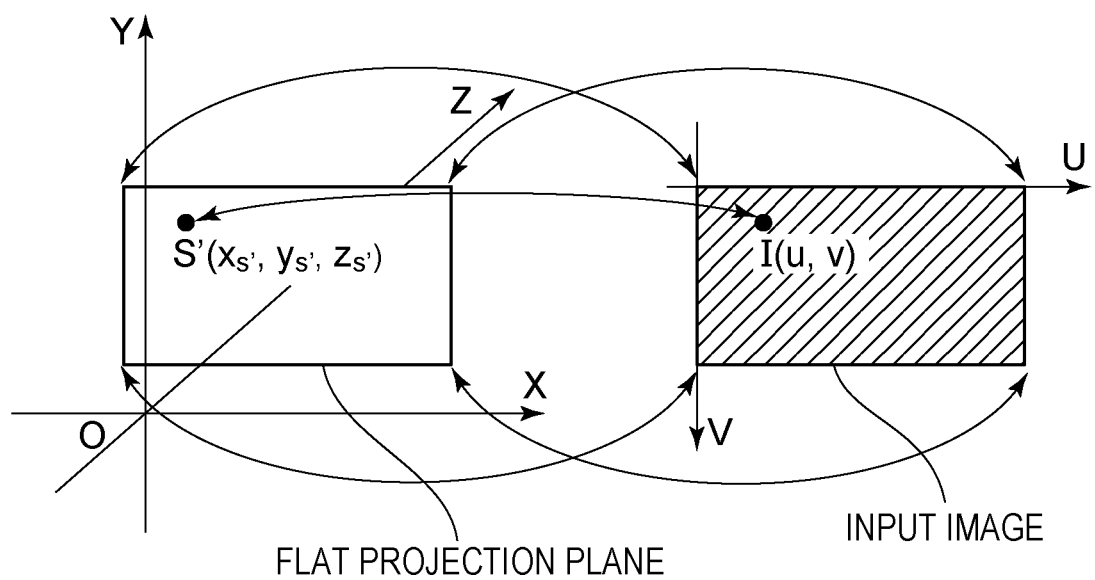
FIG. 8 is a diagram illustrating a correspondence between a flat projection plane and an input image.

In S601, the first calculating unit 2061 associates the three-dimensional coordinates of individual vertexes of the flat projection plane in the virtual space with the two-dimensional coordinates indicating the pixel positions of the input image. This is a process similar to UV mapping in typical CG rendering. In the case of using an input image captured through a central projection lens, the coordinates of the four corners of the flat projection plane are associated with the coordinates indicating the pixel positions at the four corners of the input image, as illustrated in FIG. 8. Here, it is assumed that, in the input image, the pixels positions of the individual pixels are indicated by a UV coordinate system in which the upper left pixel is the origin (0, 0). The first calculating unit 2061 acquires the UV coordinates of the individual vertexes of the input image and associates the UV coordinates with the three-dimensional coordinates of the individual vertexes of the flat projection plane. The UV coordinates of the individual pixels other than those at the four corners are calculated by linear interpolation. In a case where the projection method of the lens is equidistant projection or equisolid angle projection, such as a fisheye lens, a similar process may be performed after re-projection is performed using central projection.

Figure 9:
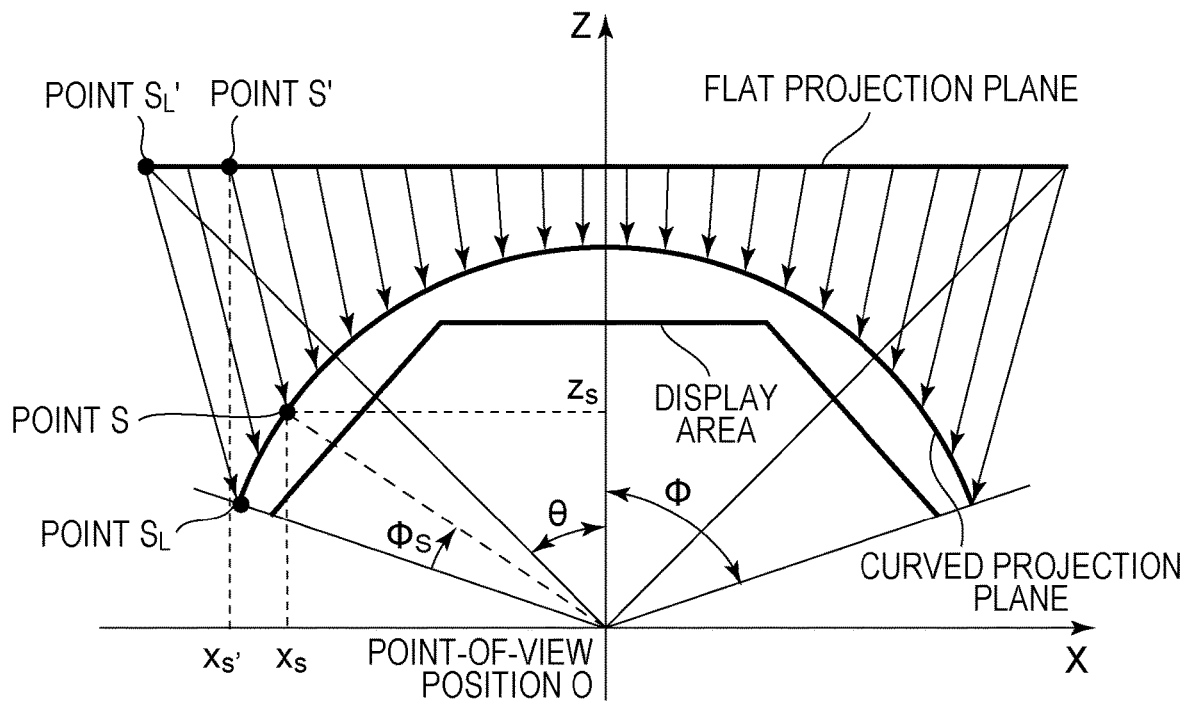
FIG. 9 is a diagram illustrating a relationship among a display area, a flat projection plane, and a curved projection plane.

In S602, the second calculating unit 2063 calculates a correspondence between the curved projection plane and the flat projection plane in the virtual space. FIG. 9 is a diagram illustrating an XZ flat plane (Y=0) illustrated in FIG. 7 viewed from above. The width of the flat projection plane is represented by $W_{flat}$ and the height thereof is represented by $H_{flat}$. When the X coordinate of a point S on the curved projection plane is represented by $x_s$ and the Z coordinate is represented by $z_s$, an angle $\phi_s$ at the point S can be expressed by Equations (1) to (3). It is assumed that the angle $\phi_s$ is 0 degrees when the point S is a point $S_L$ at the left end of the curved projection plane.

[Math. 1]

$$\phi_s = \tan^{-1}\left|\frac{z_s}{x_s}\right| - \left(\frac{\pi}{4} - \phi\right) \text{ if } x_s < 0 \quad \text{Equation (1)}$$

[Math. 2]

$$\phi_s = 2\phi - \left(\tan^{-1}\left|\frac{z_s}{x_s}\right| - \left(\frac{\pi}{4} - \phi\right)\right) \text{ else if } x_s > 0 \quad \text{Equation (2)}$$

$$\phi_s = \phi \text{ else if } x_s = 0 \quad \text{Equation (3)}$$

In a case where the point S lies in the third quadrant in the XZ flat plane ($x_s<0$), the angle $\phi_s$ can be calculated by subtracting, from an angle formed by a line segment connecting the point S to the origin and a line segment connecting the X-axis to the origin, an angle formed by a line segment connecting the point $S_L$ at the upper left end of the curved projection plane to the origin and a line segment connecting the X-axis to the origin. In a case where the point S lies in the first quadrant in the XZ flat plane ($x_s>0$), the angle $\phi_s$ can be calculated by subtracting the angle calculated by Equation (1) from the view angle $2\phi$. In a case where the point S lies on the Z-axis ($x_s=0$), the angle $\phi_s$ is $\phi$), which is half the view angle.

Subsequently, an X coordinate $x_s'$ of a point S' on the flat projection plane will be discussed. A point on the flat projection plane is associated with the curved projection plane. In the present embodiment, individual points on the flat projection plane are associated with the corresponding points on the curved projection plane such that the corresponding points are equally spaced. At this time, the ratio of the width of the flat projection plane to the length from a point $S_L'$ to the point S' on the flat projection plane matches the ratio of the arc length of the curved projection plane to the arc length from the point S corresponding to the point S' to the point $S_L$ on the curved projection plane, as expressed by Equation (4).

[Math. 3]

$$\phi_s : 2\phi = \left(\frac{W_{flat}}{2} + x_s'\right) : W_{flat} \quad \text{Equation (4)}$$

Thus, the X coordinate $x_s'$ of the point S' is expressed by Equation (5) using the angle $\phi_s$.

[Math. 4]

$$x_s' = \frac{\phi_s W_{flat}}{2\phi} - \frac{W_{flat}}{2} \quad \text{Equation (5)}$$

The second calculating unit 2063 is capable of calculating the X coordinate of the point $x_s'$ on the flat projection plane by using the X coordinate of the point $x_s$ on the curved projection plane by substituting Equation (1), Equation (2), or Equation (3) to the angle $\phi_s$ in Equation (5) in accordance with the position of $x_s$. In this way, the second calculating unit 2063 calculates the correspondence between the X coordinates of the curved projection plane and the flat projection plane.

Next, a correspondence in the Y coordinate which is a height direction will be described. The height of the curved projection plane is represented by $H_{curve}$. The Y coordinate of the point S on the curved projection plane is represented by $y_s$, and the Y coordinate of the point S' on the flat projection plane is represented by $y_s'$. As in the case of the X coordinate, the ratio of the height of the flat projection plane to the length from the lower side to the point S' on the flat projection plane matches the ratio of the height of the curved projection plane to the length from the lower side to the point S on the curved projection plane, as expressed by Equation (6).

[Math. 5]

$$y_s' + \frac{H_{flat}}{2} : H_{flat} = y_s + \frac{H_{curve}}{2} : H_{curve} \quad \text{Equation (6)}$$

Thus, the Y coordinate $y_s'$ of the point S' is expressed by Equation (7).

[Math. 6]

$$y_s' = H_{flat}\left(\frac{y_s}{H_{curve}} + \frac{1}{2}\right) - \frac{H_{flat}}{2} \quad \text{Equation (7)}$$

The second calculating unit 2063 calculates a correspondence between the Y coordinates of the curved projection plane and the flat projection plane by using Equation (7).

Finally, regarding the Z coordinate, every point on the flat projection plane has the same Z coordinate because the flat projection plane is a flat plane. Thus, the Z coordinate of the curved projection plane matches the Z coordinate of the flat projection plane that has been set in the projection plane setting process.

Figure 10:
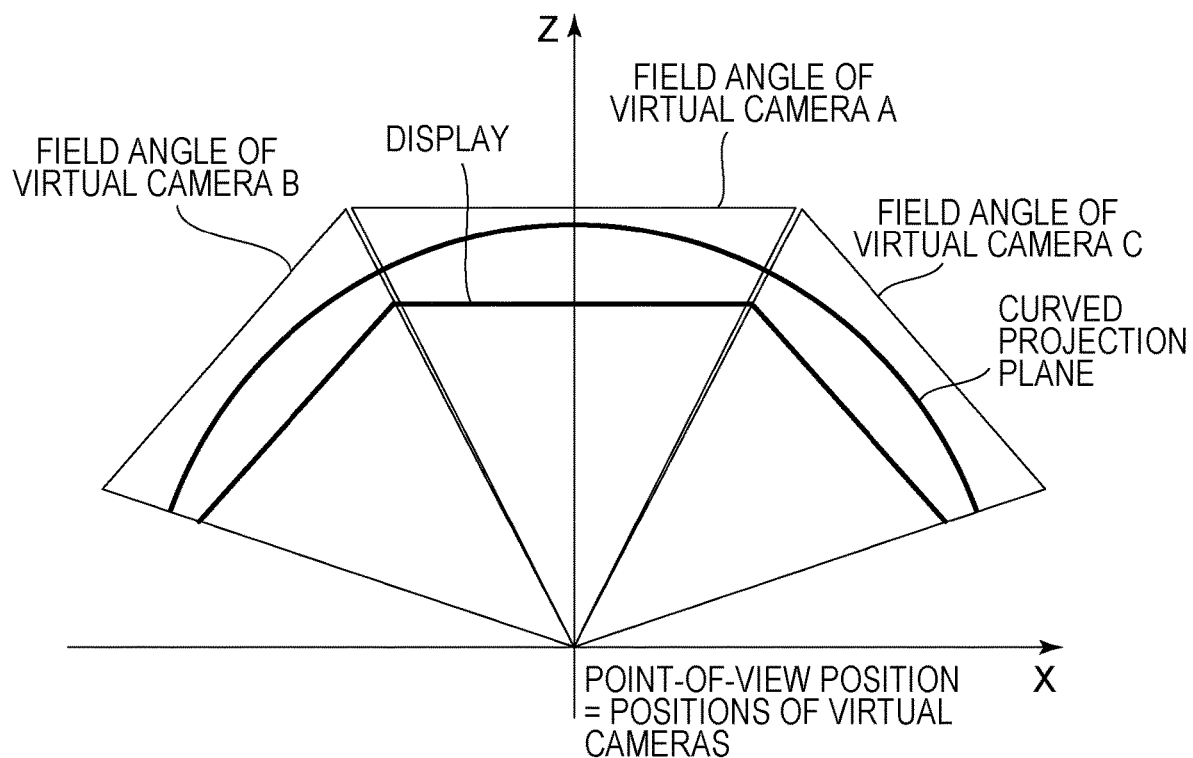
FIG. 10 is a diagram illustrating the arrangements of virtual cameras.

In S603, the virtual camera setting unit 2062 sets the positions and orientations of the virtual cameras used for a rendering process of display images. FIG. 10 is a diagram for describing the positions and orientations of the virtual cameras according to the present embodiment. The virtual camera setting unit 2062 prepares three virtual cameras corresponding to the respective displays. Specifically, the virtual camera setting unit 2062 sets a virtual camera A for the center display, sets a virtual camera B for the left display, and sets a virtual camera C for the right display in the virtual space. The positions of the individual virtual cameras are at the point-of-view position, that is, at the center of the curved projection plane. The orientations of the virtual cameras are set such that the optical axis of each virtual camera matches the center of the corresponding one of the displays.

In S604, the virtual camera setting unit 2062 sets the field angles of the virtual cameras. The virtual camera setting unit 2062 sets, as the field angle of each virtual camera, the view angle at which the display corresponding to the virtual camera is viewed from the point-of-view position.

In S605, the rendering processing unit 2064 executes a rendering process for each of the three virtual cameras to generate pieces of display image data representing display images. Specifically, first, the rendering processing unit 2064 calculates the three-dimensional coordinates on the curved projection plane projected to individual pixels of an image acquired when the virtual camera captures the image in the virtual space. Subsequently, the rendering processing unit 2064 converts the three-dimensional coordinates on the curved projection plane to the three-dimensional coordinates on the flat projection plane on the basis of the correspondence between the flat projection plane and the curved projection plane calculated in S602. Furthermore, the rendering processing unit 2064 converts the three-dimensional coordinates on the flat projection plane to positions on the input image on the basis of the correspondence between the flat projection plane and the input image calculated in S601. Accordingly, the pixels of the image acquired by the virtual camera are associated with positions on the input image.

The rendering processing unit 2064 performs sampling on the basis of a calculated position on the input image, thereby calculating the pixel values of pixels in an image acquired by the virtual camera. Specifically, the rendering processing unit 2064 acquires the pixel values of four pixels around the calculated position in the input image. The rendering processing unit 2064 executes interpolation on the pixel values of the four pixels acquired from the input image in accordance with the calculated position, thereby determining the pixel values of pixels in the image acquired by the virtual camera. As a result of performing the above process on all the pixels of each virtual camera, display images to be displayed on the respective displays are generated.

As described above, in the present embodiment, the display images to be displayed on the three displays screens (displays) are generated on the basis of one input image. Conventionally, in the case of displaying images by using a plurality of display screens, images corresponding to the respective display screens are captured. For example, in the case of the display area illustrated in FIG. 4, three image capturing apparatuses are placed such that the optical axes substantially pass through the centers of the respective display screens at the same point-of-view position in a scene, and each image capturing apparatus shoots a scene. From three input images acquired from the respective image capturing apparatuses, display images corresponding to the respective display screens are generated. However, in this method, a plurality of image capturing apparatuses are necessary for shooting. Furthermore, it is necessary to set the shooting parameters of the respective image capturing apparatuses to similar parameters so that the images on the display screens are naturally connected to each other when displayed in the display area. However, appropriate shooting parameters vary according to the brightness of a scene or a moving object, and, every time the shooting parameter of any one of the image capturing apparatuses is changed, the shooting parameters of the other image capturing apparatuses need to be adjusted. Accordingly, in the present embodiment, individual display images are generated on the basis of one input image acquired through shooting by one image capturing apparatus, and thereby the load of shooting for display in the display area can be reduced. In addition, the respective display images are images captured under a common shooting parameter, and thus the brightness and distance of the same subject are substantially the same in the individual display images. Thus, it is possible to realize a display system in which individual display screens are naturally connected to each other when the display images are generated on a plurality of display screens and the viewer feels like he/she is actually in the scene.

Furthermore, in the case of generating a plurality of display images on the basis of one input image, it is assumed that the view angle is larger than the shooting field angle as illustrated in FIG. 9. To display an image viewed from the point-of-view position in the display area, the flat projection plane and the individual pixels in the display area are associated with each other such that the image is placed within the range between line segments connecting the both ends of the flat projection plane to the point-of-view position. In this case, the image is displayed on a part of the left and right displays in the display area. That is, in a case where the view angle is larger than the shooting field angle, the width (the length in the horizontal direction) of the display images in the display area is larger than the width (the length in the horizontal direction) of one input image, and thus the display area has a region in which no image is displayed. Accordingly, in the present embodiment, on the basis of the shooting field angle at the time of capturing an input image and the view angle in the display area, the input image is expanded such that the shooting field angle of the input image satisfies the view angle. Specifically, a correspondence is established such that the width of the flat projection plane corresponding to the input image matches the width of the curved projection plane corresponding to the display images. Accordingly, a situation is prevented from occurring where the left and right displays in the display area have a region in which no image is displayed.

In addition, the flat projection plane is directly mapped to the individual displays in the virtual space. At this time, the center display is parallel to the flat projection plane whereas the left and right displays are not parallel to the flat projection plane. Thus, if the flat projection plane is directly projected in parallel to the individual displays, a subject that is at the same position in a scene is displayed on the displays at different distances, and thus the distance to the subject viewed from the point-of-view position unnaturally varies between the displays. Additionally, in parallel projection, the interval between positions on the center display corresponding to positions at a predetermined interval on the flat projection plane is different from the interval between positions on the left and right displays corresponding to the positions at the predetermined interval on the flat projection plane. Thus, a subject on the left and right displays may be unnaturally expanded in the horizontal direction, or the sense of resolution may vary. Accordingly, in the present embodiment, display images to be displayed on the respective displays are generated by using a curved projection plane different from the display area in the display system. In addition, the flat projection plane is associated with the curved projection plane such that the positions at a predetermined interval on the flat projection plane are positions at an equal interval also on the curved projection plane. Accordingly, the flat projection plane in the virtual space can be associated with the curved projection plane so as to extend it in accordance with the view angle, and it becomes possible to generate display images for displaying a wide-field image to the viewer. In particular, in a case where a wide-field image is displayed in the display area that is placed so as to cover the field of view of the viewer by using a plurality of flat displays, it is possible to provide natural display images to the display area without causing the viewer to feel like a subject is bent near a boundary at which displays are adjacent to each other.

In the present embodiment, a description has been given of, as an example, software in which the individual components illustrated in FIGS. 2A-2B are implemented when the CPU 101 executes a program. However, some or all of the components illustrated in FIGS. 2A-2B can be implemented by a dedicated processing circuit.

In a second embodiment, a description will be given of a method for changing the curvature of a curved projection plane in accordance with an input image. For example, it is assumed that an input image is an image of a soccer ground captured from a touchline side. A description will be given of the case of generating a display image by using an input image in which a subject that is known to everyone as being a straight line, such as a touchline of a soccer ground, linearly extends in the horizontal direction in the input image. In the present embodiment, the curvature of the curved projection plane is changed to reduce unnaturalness resulting from the perception of distortion of the straight line of such a subject. The display system according to the present embodiment is similar to that of the first embodiment. A flow of entire processing performed by the image processing apparatus is similar to the flowchart in FIG. 3 described in the first embodiment, and thus the description thereof is omitted. Here, a description will be given of the details of a projection plane setting process different from that of the first embodiment. Note that the same components are denoted by the same reference numerals in the description.

Projection Plane Setting Process

Figure 11:
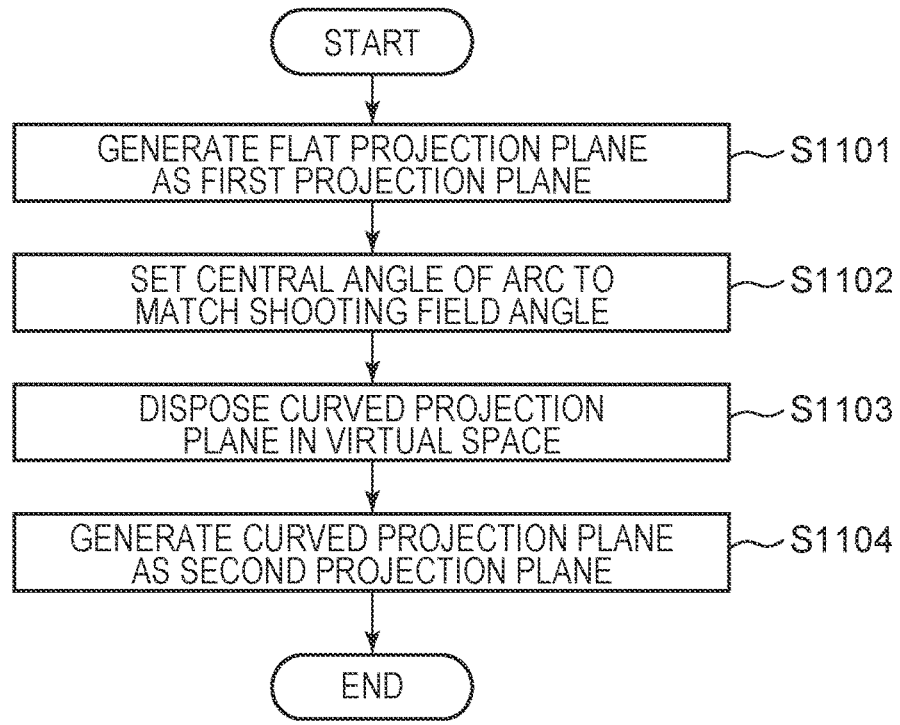
FIG. 11 is a flowchart illustrating a flow of a projection plane setting process.

FIG. 11 is a flowchart illustrating the details of a projection plane setting process executed by the projection plane setting unit 201 in the present embodiment. In the projection plane setting process, two projection planes are set, a flat projection plane corresponding to an input image and a curved projection plane having a shape formed by cutting out a part of a side surface of a cylinder.

In S1101, the projection plane setting unit 201 generates a flat projection plane as a first projection plane. The details of the process is similar to the process described in S501 of the first embodiment and thus the description thereof is omitted.

In S1102, the projection plane setting unit 201 sets the central angle of an arc shape formed by a curved projection plane. In the present embodiment, the shooting field angle in the horizontal direction at the time of capturing the input image is set as the central angle of the curved projection plane.

In S1103, the projection plane setting unit 201 determines a setting position of the curved projection plane in a virtual space such that the view angle in the horizontal direction at which the curved projection plane is viewed from the point-of-view position matches the view angle in the horizontal direction of the display area (displays).

Figure 12:
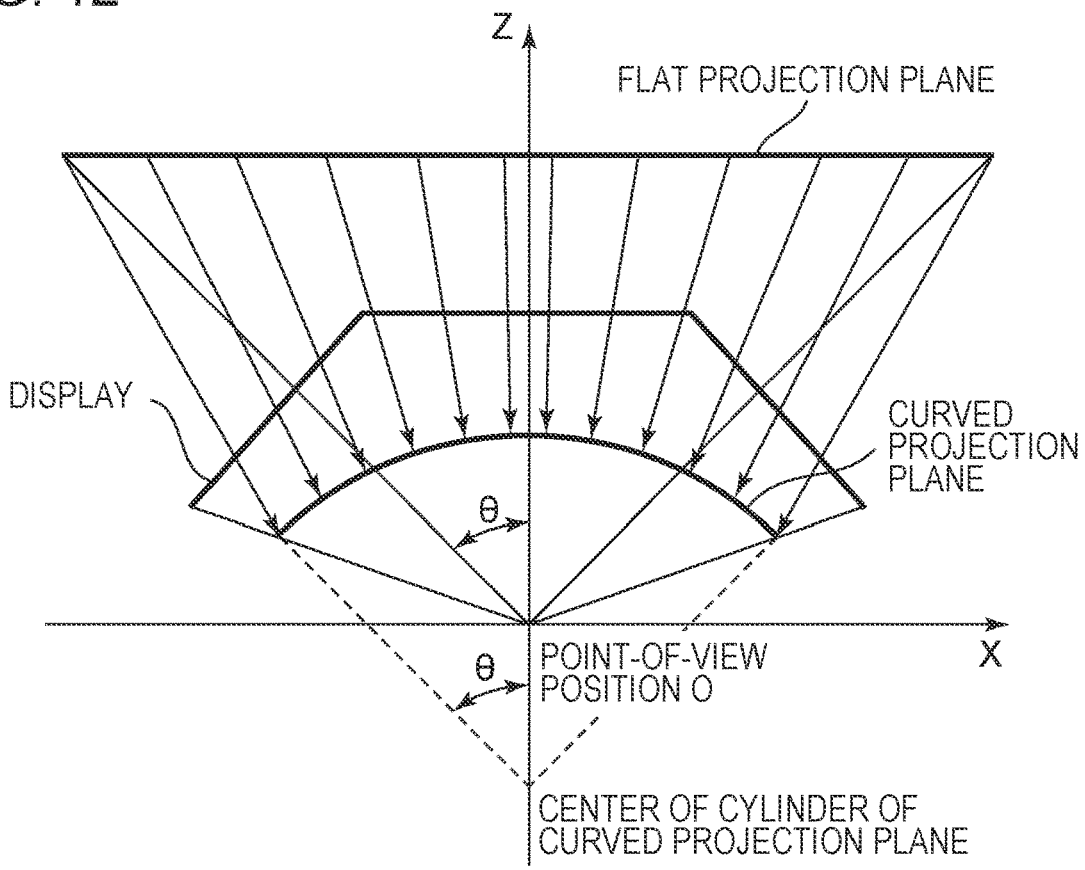
FIG. 12 is a diagram illustrating a relationship among a display area, a flat projection plane, and a curved projection plane.

In S1104, the projection plane setting unit 201 generates a curved projection plane and places it in the virtual space. The curved projection plane has a shape cut out at the central angle set in S1102 and is placed at the setting position in the virtual space set in S1103. FIG. 12 is a diagram illustrating a positional relationship among the curved projection plane, the flat projection plane, and the display area (displays) when the virtual space is viewed in the XZ flat plane. The Z-axis passes through the center of the curved projection plane, and the projection planes are vertical to the XZ flat plane. Here, unlike in the first embodiment, the center of the circle of the curved projection plane does not necessarily match the point-of-view position. In addition, the height of the curved projection plane is set such that the ratio between the length and height of the arc matches the ratio between the width and height of the flat projection plane.

The curved projection plane set in the foregoing manner has a curvature smaller than that of the curved projection plane described in the first embodiment. Accordingly, in the case of performing a rendering process on an input image including a subject that is linear in the horizontal direction, distortion of the straight line can be further reduced. As a result, when a display image is displayed in the display system, it is possible to reduce unnaturalness caused by viewer's perception of distortion of the straight line in the horizontal direction in the display image.

In the present embodiment, the central angle of the circle of the curved projection plane is caused to match the shooting field angle at which the input image has been captured. However, for example, the central angle of the curved projection plane may be set in accordance with the type of subject or the degree of distortion. This is a process equivalent to control of the curvature of the curved projection plane.

Figure 13:
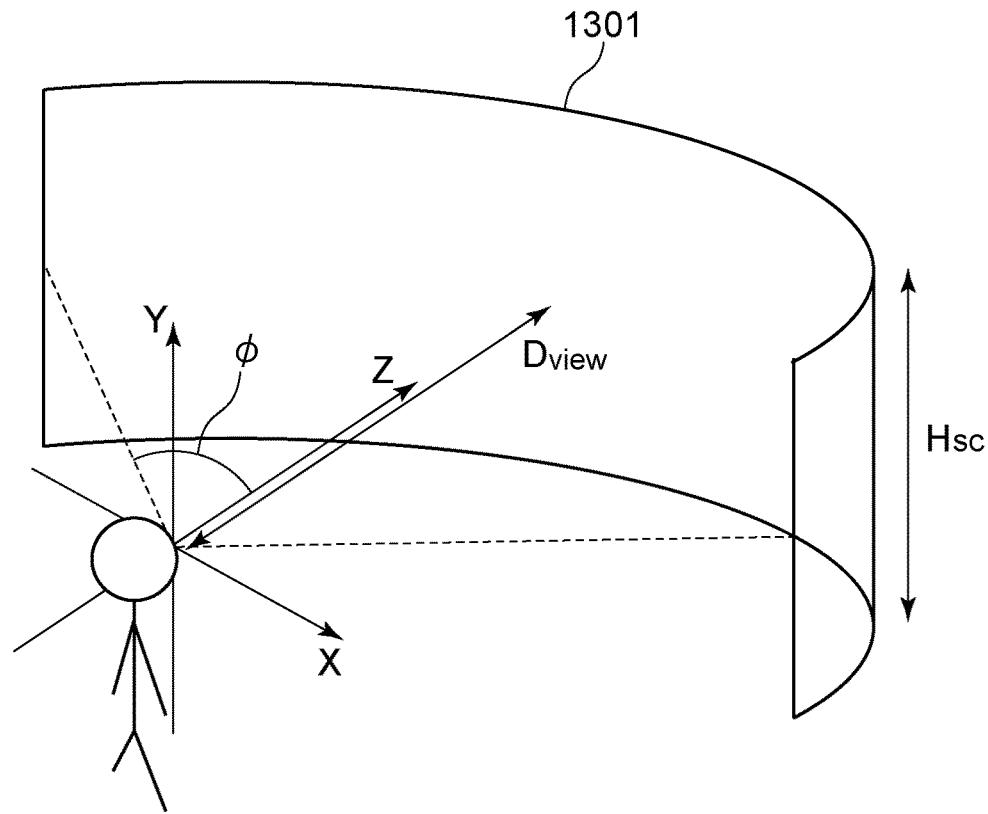
FIG. 13 is a diagram illustrating an example of a curved-surface display.

In a third embodiment, a description will be given of a process of generating a display image in a case where the display area in the display system is a curved-surface display having a shape formed by cutting out a part of a side surface of a cylinder. FIG. 13 illustrates an example of the display area in the present embodiment. Here, it is assumed that the point of view of the viewer is positioned at the center of a cylindrical surface indicating a curved-surface display 1301 and that the curved-surface display 1301 is placed such that the view angle of the curved-surface display viewed from the viewer is 2ϕ. The curved-surface display 1301 is placed such that the center of the curved-surface display 1301 corresponds to a position at a distance $D_{view}$ from the viewer. It is assumed that the distance $D_{view}$ matches the radius of the cylindrical surface indicating the curved-surface display 1301. In addition, the curved-surface display 1301 has a height $H_{sc}$.

In the present embodiment, as in the first embodiment, a display image for the curved-surface display is generated on the basis of an image formed by projecting the flat projection plane (first projection plane) onto the curved projection plane (second projection plane). However, in the present embodiment, unlike in the first embodiment, the display area is constituted by a smooth curved surface without a corner and thus the curved projection plane is set so as to match the shape of the curved-surface display constituting the display area.

Figure 14:
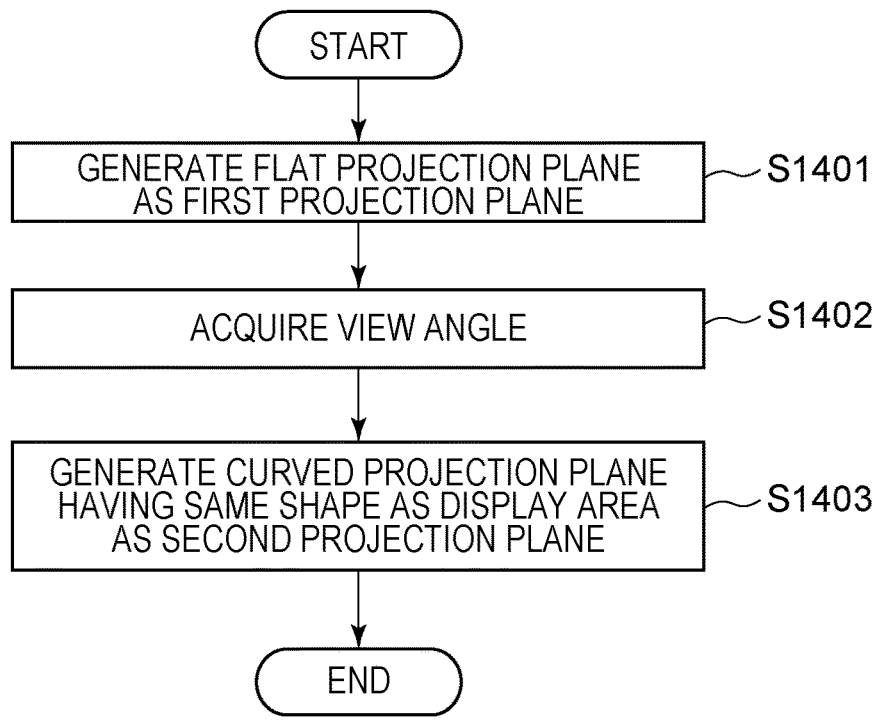
FIG. 14 is a flowchart illustrating a flow of a projection plane setting process.

FIG. 14 is a flowchart illustrating the details of a projection plane setting process executed by the projection plane setting unit 201 according to the present embodiment. Hereinafter, individual steps of the flowchart will be described.

In S1401, the projection plane setting unit 201 generates a flat projection plane as a first projection plane. The flat projection plane is constituted by a rectangular flat plane having the same aspect ratio as the captured image. In addition, the projection plane setting unit 201 calculates the size and position of the flat projection plane and places the flat projection plane in a virtual space such that the view angle at which the flat projection plane is viewed from the point-of-view position matches the shooting field angle.

In S1402, the projection plane setting unit 201 acquires a view angle, which is a view angle at which the display area is viewed from the point-of-view position. As illustrated in FIG. 13, in the present embodiment, the angle between the straight lines connecting the point-of-view position to center points in the up-down direction of the left and right ends of the curved-surface display is regarded as a view angle in the horizontal direction. When the view angle is 2ϕ, an angle ϕ is ½ of the view angle.

In S1403, the projection plane setting unit 201 generates a curved projection plane in the virtual space. The curved projection plane is set so as to have the same shape as the curved-surface display constituting the display area. That is, setting is performed such that the central angle of the curved surface matches the view angle 2ϕ and that the height of the curved projection plane matches the height $H_{sc}$ of the curved-surface display. The projection plane setting unit 201 places, in the virtual space, the curved projection plane that has been set in accordance with display system information such that the center of the cylindrical surface matches the point-of-view position. Thus, the curved projection plane is placed at a position at which the Z-axis in the virtual space passes through the center of the curved projection plane. As described above, in the curved projection plane, the cross section of the curved surface has an arc-shape having a central angle equal to the view angle, and the center of the cylindrical surface matches the point-of-view position.

Figure 15:
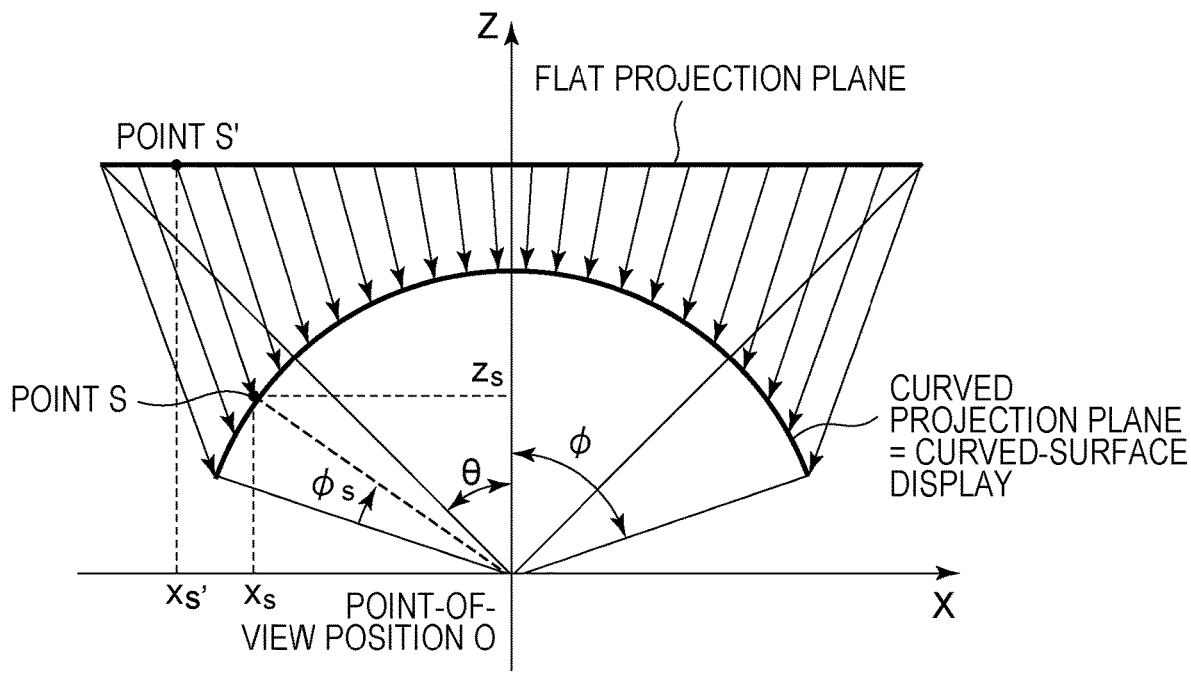
FIG. 15 is a diagram illustrating a relationship among a display area, a flat projection plane, and a curved projection plane.

FIG. 15 is a diagram illustrating the XZ flat plane (Y=0) showing a relationship among the flat projection plane, the curved projection plane, and the curved-surface display constituting the display area viewed from above in the present embodiment. As can be understood from this figure, the curved projection plane has the same shape as the curved-surface display in the present embodiment.

A flow of entire image processing in the present embodiment is similar to the flow described in the first embodiment with reference to FIG. 3, and thus the description thereof is omitted.

Figure 16:
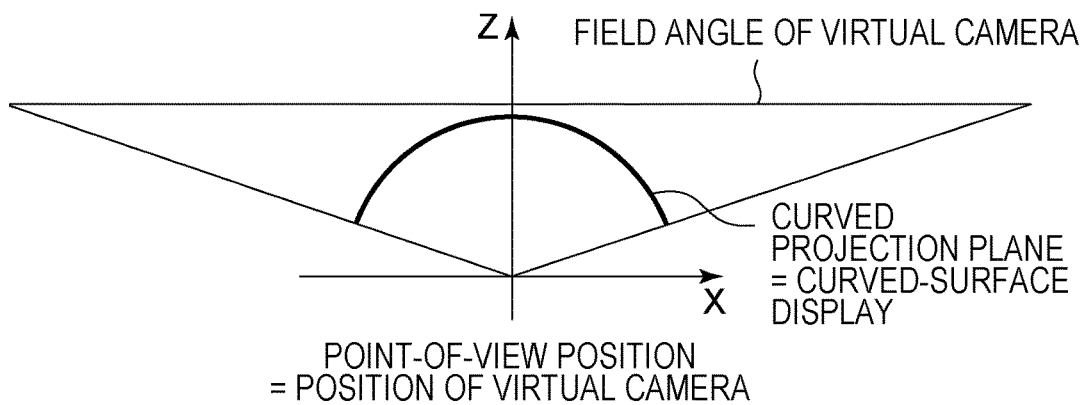
FIG. 16 is a diagram illustrating the arrangements of a virtual camera.

Also, a flow of a display image data generation process is basically similar to the process described in the first embodiment with reference to FIG. 6. In the first embodiment, the virtual camera setting unit 2062 prepares three virtual cameras corresponding to the respective displays in S603. In the present embodiment, one curved-surface display is used as a display and thus one virtual camera corresponding thereto is sufficient. The position of the virtual camera is the point-of-view position, that is, the center of the curved projection plane. The orientation of the virtual camera is set such that the optical axis matches the Z-axis. The field angle of the virtual camera is set so as to match the view angle at which the curved-surface display is viewed from the point-of-view position. FIG. 16 illustrates a relationship between the curved projection plane and the virtual camera in the present embodiment.

Figure 17:
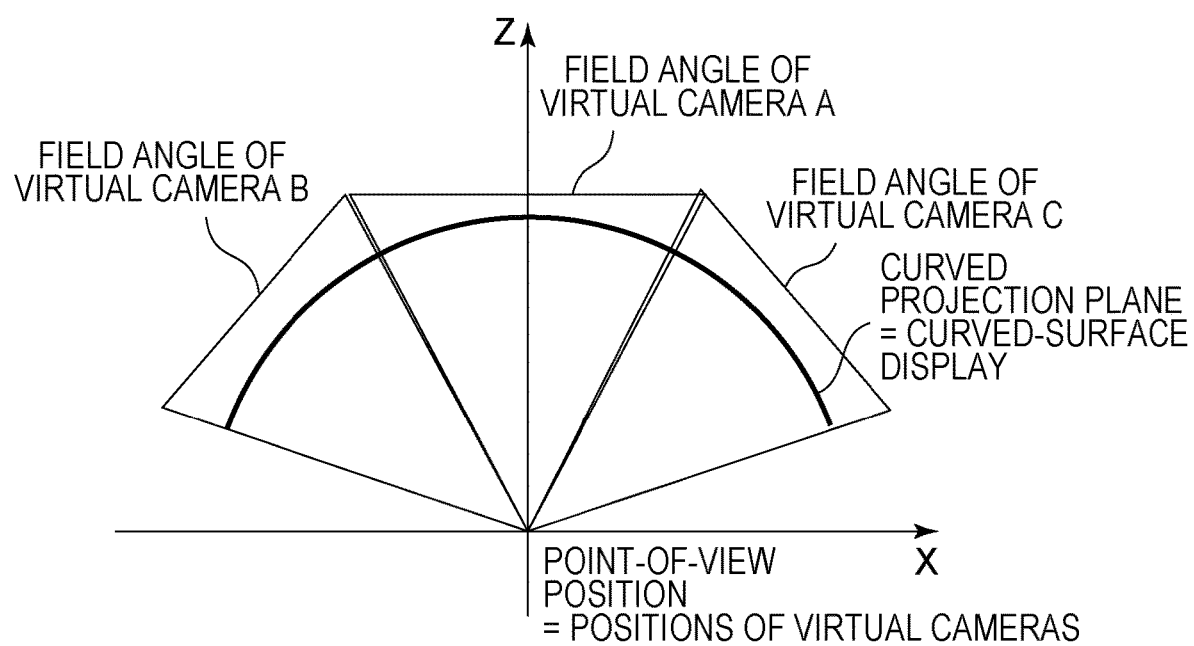
FIG. 17 is a diagram illustrating the arrangements of virtual cameras.

The method for setting the virtual camera is not limited thereto. For example, a plurality of virtual cameras may be set to generate a display image. FIG. 17 illustrates an example of the case of generating a display image by using three virtual cameras. A display image can be generated by setting the individual virtual cameras so as to satisfy the central angle of the curved projection plane, that is, the view angle of the curved-surface display, when the field angles of the plurality of virtual cameras are adjusted, and by combining rendered images. The rendering ranges of the individual virtual cameras can be set so as to overlap each other. For example, this is applicable in a case where the display area is constituted by a curved-surface screen and images are projected onto the curved-surface screen by a plurality of projectors such that the images partially overlap each other. In this case, a rendering process is performed by setting the orientations and field angles of the virtual cameras so as to correspond to the projection ranges of the individual projectors. The individual projectors project corresponding display images, an alpha blending process is performed on overlapped portions of the images, and accordingly a continuous single image can be viewed.

As described above, in a case where the display area is constituted by a smooth curved surface like a surface obtained by cutting out a part of a side surface of a cylinder, a natural display image can be generated by performing a process by setting a second projection plane in accordance with the shape of the display area.

Modification Example

In the above-described embodiments, a display image is generated after a projection plane setting process. Such a projection plane setting process is necessary at the time of generating for the first time a display image to be displayed in the display system assumed in the above-described embodiments. However, for example, in a case where a display system and an image capturing apparatus are installed in a fixed manner, a projection plane setting process is not always necessary. For example, information indicating a flat projection plane and a curved projection plane in a virtual space is set in advance on the basis of display system information, and the information is stored in the ROM 103 or the HDD 105. In addition, information indicating the correspondence between the input image and the flat projection plane calculated in S601 and information indicating the correspondence between the flat projection plane and the curved projection plane calculated in S602 at the time of generating a display image are also stored. In this case, the process illustrated in FIG. 5 is not necessary, and the process may proceed from S304 to S306. Regarding S601 and S602, a process of reading out the stored information indicating the correspondence between the input image and the flat projection plane and the stored information indicating the correspondence between the flat projection plane and the curved projection plane may be executed instead of the calculation process. Of course, the correspondence between the flat projection plane and the curved projection plane is a correspondence based on a desired display system, and thus a display image hardly having unnaturalness is generated. Accordingly, in a case where there is no large variation in the display style of the display system, a display image can be generated more easily.

In addition, in a case where the display system is changed, the stored information indicating the projection planes in the virtual space may be read out for adjustment. In the read out virtual space, a flat projection plane based on a shooting field angle and point-of-view information and a curved projection plane based on the display system are placed. For example, the shape of the curved projection plane is changed in accordance with a change in the view angle, or the position of the curved projection plane in the virtual space is changed in accordance with a change in the point-of-view information, and thereby the projection plane is set and stored again.

Other Embodiments

A view angle, which is an angle of viewing the display area from the point-of-view position by a viewer in the present embodiments can be regarded as a range used for display in an input image.

In the above-described embodiments, a projection plane called a curved projection plane is set as a second projection plane. The curved projection plane is, as illustrated in FIG. 7, a developable plane formed by bending a flat plane in the horizontal direction with respect to the point of view. It is desirable that the second projection plane be a plane having an intermediate shape between an input image, which is a flat plane with respect to the point of view, and the display area.

In the above-described embodiments, a description has been given of, as an example, a case where the display area is constituted by three displays in the display system for displaying a display image. As the display area, a screen onto which an image is projected by a projector may be used instead of a light-emitting display. In this case, in the display system, a plurality of projectors corresponding to a plurality of screens are installed such that display images can be projected onto the respective screens. Alternatively, the above-described embodiments can be applied to a display system in which a plurality of projectors perform projection onto a white wall. In a case where the wall onto which the images are to be projected has a shape similar to that of the displays illustrated in FIG. 4 when viewed from above, a similar effect can be acquired by generating a display image by using a curved projection plane. In this case, display system information is acquired by regarding, as a display area, a region of the white wall onto which an image is projected.

A description has been given of an example of using one common curved projection plane for the center display 401, the left display 402, and the right display 403. This makes it possible to generate a display image that can be displayed without causing unnaturalness between different displays. However, for example, projection planes having different curved planes may be set for the respective three displays. In this case, it is desired that the three curved projection planes be smoothly connected to each other.

In the above-described embodiments, a description has been given of, as an example, a display area using a large display for the viewer, as illustrated in FIG. 4. However, a similar display system can be constituted by using, for example, a plurality of flat display screens, even if the display area has such a size as to cover only the head. An example is a head-mounted display. Also in this case, when the display screens that are flat and constitute the display area are placed such that the normals to the individual display screens have an intersection point on the side of displaying an image, a wide-field realistic image can be displayed. Also in such a display system, display images for the respective display screens are generated from one common input image as in the above-described embodiments. Furthermore, as a result of performing rendering by using a curved projection plane as well as a flat projection plane onto which an input image is projected in a virtual space, a wide-field image without unnaturalness can be generated.

In the above-described embodiments, point-of-view information is specified by designating a desired position of a viewer. However, for example, the position of the viewer may be actually detected, and point-of-view information may be set in accordance with the viewer who is actually viewing the display system.

In the above-described embodiments, a flat projection plane is set as a rectangular flat plane having the same aspect ratio as a captured image. However, in the case of displaying only a partial region of an input image, not the entire input image, the flat projection plane may be set as a rectangular flat plane having the aspect ratio of the partial region. In this case, the first calculating unit 2061 associates the coordinates of the four corners of the flat projection plane with the coordinates of the pixel positions at the four corners of the partial region in the input image, and accordingly a display image generated from the partial region of the input image can be displayed in the display area.

An embodiment of the present invention can generate a more natural display image for an image display system capable of displaying an image at a wide viewing angle.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus that generates a display image to be displayed in a display system including a display area, the image processing apparatus comprising:
   an obtaining unit configured to obtain one input image acquired through shooting by one image capturing apparatus;
   a generating unit configured to generate the display image from the input image on the basis of a correspondence between a first projection plane corresponding to the input image and a second projection plane corresponding to the display area; and
   a holding unit configured to hold information indicating the correspondence,
   wherein the correspondence is a correspondence calculated in accordance with a shooting field angle at which the input image has been captured and a view angle with which the display image is displayed in the display area with respect to a point-of-view position,
   wherein the first projection plane has a size that is based on the shooting field angle,
   wherein the second projection plane has a size that is based on the view angle,
   wherein the correspondence is a relationship that is based on a ratio of a length of the first projection plane in a horizontal direction to a length of the second projection plane in the horizontal direction,
   wherein the correspondence is a relationship in which positions at a predetermined interval on the first projection plane are associated with corresponding positions on the second projection plane such that the corresponding positions are equally spaced,
   wherein the first projection plane is a flat plane,
   wherein the second projection plane is a plane formed by curving a flat plane in a horizontal direction, and
   wherein the correspondence has a linearity relationship between a coordinate indicating a position of a point on the first projection plane and an angle indicating a position of a point on the second projection plane such that the coordinate indicating a position of a point of the first projection plane is equal to the sum of (a) a first constant multiplied by the angle indicating a position of a point of the second projection plane and (b) a second constant.

2. The image processing apparatus according to claim 1, further comprising:
a display system information acquiring unit configured to acquire display system information including information indicating the view angle;
a shooting parameter acquiring unit configured to acquire information indicating the shooting field angle; and
a setting unit configured to set the correspondence on the basis of the information indicating the view angle and the information indicating the shooting field angle.

3. The image processing apparatus according to claim 2, wherein the setting unit is further configured to place the first projection plane in a virtual space in accordance with the shooting field angle, to place the second projection plane in the virtual space in accordance with the view angle, and to associate the first projection plane and the second projection plane with each other, to calculate the correspondence.

4. The image processing apparatus according to claim 3, wherein the setting unit is further configured to place the first projection plane and the second projection plane in the virtual space such that a point-of-view position corresponding to the first projection plane is a position identical to a point-of-view position for the second projection plane.

5. The image processing apparatus according to claim 1, wherein the display area has a configuration in which a plurality of flat display screens are placed, each display screen being capable of displaying an image, and
wherein the generating unit is further configured to generate a plurality of display images each of which is to be displayed on a corresponding one of the plurality of display screens.

6. The image processing apparatus according to claim 5, wherein the second projection plane has a shape different from a shape of the display area.

7. The image processing apparatus according to claim 5, wherein at least two display screens among the plurality of display screens are placed such that normals to the two display screens have an intersection point.

8. The image processing apparatus according to claim 1, wherein the first projection plane is a rectangular plane having an aspect ratio identical to an aspect ratio of the input image.

9. The image processing apparatus according to claim 3, wherein the setting unit is further configured to calculate a size and position of the first projection plane such that a view angle at which the first projection plane is viewed from a point-of-view position in the virtual space matches the shooting field angle.

10. The image processing apparatus according to claim 2, wherein the setting unit is further configured to set, as the second projection plane, a projection plane which constitutes a fan-shaped pillar with a center on the point-of-view position, and to set a ratio of a length of an arc of the second projection plane to a height of the second projection plane to match a ratio of a width of the first projection plane to a height of the first projection plane.

11. The image processing apparatus according to claim 1, wherein the generating unit is further configured to execute, using a virtual camera corresponding to the display area, a rendering process of rendering an image corresponding to the virtual camera to generate the display image.

12. The image processing apparatus according to claim 11, wherein the generating unit is further configured to calculate positions in the input image corresponding to individual pixels of an image acquired through shooting performed by the virtual camera in a virtual space, and samples the input image on the basis of the calculated positions, to generate a display image corresponding to the virtual camera.

13. A display system comprising a display area in which an image is displayed,
wherein the display area has a configuration in which a plurality of flat display screens are placed, each display screen being capable of displaying an image,
wherein a display image to be displayed on each of the plurality of display screens is generated on the basis of one input image acquired through shooting by one image capturing apparatus,
wherein the display area displays an image resulting from projecting the input image on a projection plane having a shape formed by cutting out a part of a cylindrical surface,
wherein the display system further comprises an image processing apparatus that generates the display image to be displayed in the display area, the image processing apparatus comprising:
(1) an obtaining unit configured to obtain the input image acquired through shooting by the image capturing apparatus;
(2) a generating unit configured to generate the display image from the input image on the basis of a correspondence between a first projection plane corresponding to the input image and a second projection plane corresponding to the display area; and
(3) a holding unit configured to hold information indicating the correspondence,
wherein the correspondence is a correspondence calculated in accordance with a shooting field angle at which the input image has been captured and a view angle with which the display image is displayed in the display area with respect to a point-of-view position,
wherein the first projection plane has a size that is based on the shooting field angle,
wherein the second projection plane has a size that is based on the view angle,
wherein the correspondence is a relationship that is based on a ratio of a length of the first projection plane in a horizontal direction to a length of the second projection plane in the horizontal direction,
wherein the correspondence is a relationship in which positions at a predetermined interval on the first projection plane are associated with corresponding positions on the second projection plane such that the corresponding positions are equally spaced,
wherein the first projection plane is a flat plane,
wherein the second projection plane is a plane formed by curving a flat plane in a horizontal direction, and
wherein the correspondence has a linearity relationship between a coordinate indicating a position of a point on the first projection plane and an angle indicating a position of a point on the second projection plane such that the coordinate indicating a position of a point of the first projection plane is equal to the sum of (a) a first constant multiplied by the angle indicating a position of a point of the second projection plane and (b) a second constant.

14. A non-transitory computer-readable medium storing a program which, when executed by a computer comprising a processor and a memory, causes the computer to perform an image processing method of generating a display image to be displayed in a display system including a display area, the method comprising:
- obtaining one input image acquired through shooting by one image capturing apparatus; and
- generating the display image from the input image on the basis of a correspondence between a first projection plane corresponding to the input image and a second projection plane corresponding to the display area,
- wherein information indicating the correspondence is held in a holding unit,
- wherein the correspondence is a correspondence calculated in accordance with a shooting field angle at which the input image has been captured and a view angle with which the display image is displayed in the display area with respect to a point-of-view position,
- wherein the first projection plane has a size that is based on the shooting field angle,
- wherein the second projection plane has a size that is based on the view angle,
- wherein the correspondence is a relationship that is based on a ratio of a length of the first projection plane in a horizontal direction to a length of the second projection plane in the horizontal direction,
- wherein the correspondence is a relationship in which positions at a predetermined interval on the first projection plane are associated with corresponding positions on the second projection plane such that the corresponding positions are equally spaced,
- wherein the first projection plane is a flat plane,
- wherein the second projection plane is a plane formed by curving a flat plane in a horizontal direction, and
- wherein the correspondence has a linearity relationship between a coordinate indicating a position of a point on the first projection plane and an angle indicating a position of a point on the second projection plane such that the coordinate indicating a position of a point of the first projection plane is equal to the sum of (a) a first constant multiplied by the angle indicating a position of a point of the second projection plane and (b) a second constant.

15. An image processing method of generating a display image to be displayed in a display system including a display area, the method comprising:
- obtaining one input image acquired through shooting by one image capturing apparatus; and
- generating the display image from the input image on the basis of a correspondence between a first projection plane corresponding to the input image and a second projection plane corresponding to the display area,
- wherein information indicating the correspondence is held in a holding unit,
- wherein the correspondence is a correspondence calculated in accordance with a shooting field angle at which the input image has been captured and a view angle with which the display image is displayed in the display area with respect to a point-of-view position,
- wherein the first projection plane has a size that is based on the shooting field angle,
- wherein the second projection plane has a size that is based on the view angle,
- wherein the correspondence is a relationship that is based on a ratio of a length of the first projection plane in a horizontal direction to a length of the second projection plane in the horizontal direction,
- wherein the correspondence is a relationship in which positions at a predetermined interval on the first projection plane are associated with corresponding positions on the second projection plane such that the corresponding positions are equally spaced,
- wherein the first projection plane is a flat plane,
- wherein the second projection plane is a plane formed by curving a flat plane in a horizontal direction, and
- wherein the correspondence has a linearity relationship between a coordinate indicating a position of a point on the first projection plane and an angle indicating a position of a point on the second projection plane such that the coordinate indicating a position of a point of the first projection plane is equal to the sum of (a) a first constant multiplied by the angle indicating a position of a point of the second projection plane and (b) a second constant.

\* \* \* \* \*